US005442348A

United States Patent [19]

Mushell

[11] Patent Number: 5,442,348

[45] Date of Patent: Aug. 15, 1995

[54] COMPUTERIZED PARKING METER

[75] Inventor: Joshua Mushell, Denver, Colo.

[73] Assignee: Park-A-Tron Limited Liability Company, Greeley, Colo.

[21] Appl. No.: 30,650

[22] Filed: Mar. 12, 1993

[51] Int. Cl.[6] .............................................. B60Q 1/48

[52] U.S. Cl. ............................ 340/932.2; 340/309.15; 340/539; 340/825.31; 340/825.54; 194/205; 194/217; 194/318; 194/902; 377/28

[58] Field of Search ........... 340/932.2, 309.15, 825.31, 340/539, 825.34, 825.54; 194/200, 205, 217, 218, 317, 318, 902; 377/28

[56] References Cited

U.S. PATENT DOCUMENTS

| | | | |
|---|---|---|---|
| Re. 29,511 | 1/1978 | Rubenstein | 58/142 |
| 3,486,325 | 12/1969 | Cochran et al. | 58/142 |
| 3,538,870 | 10/1970 | Mitchell | 58/142 |
| 3,999,372 | 12/1976 | Welch et al. | 58/142 |
| 4,031,991 | 6/1977 | Malott | 194/1 R |
| 4,043,117 | 8/1977 | Maresca et al. | 58/142 |
| 4,167,104 | 9/1979 | Bond | 70/208 |
| 4,173,272 | 11/1979 | Von Knorring | 194/9 T |
| 4,356,903 | 11/1982 | Lemelson et al. | 194/217 |
| 4,823,928 | 4/1989 | Speas | 194/217 |
| 4,825,425 | 4/1989 | Turner | 368/7 |
| 4,827,206 | 5/1989 | Speas | 323/299 |
| 4,829,296 | 5/1989 | Clark et al. | 340/825.31 |
| 4,870,418 | 9/1989 | Kal et al. | 341/133 |
| 4,872,149 | 10/1989 | Speas | 368/90 |
| 4,895,238 | 1/1990 | Speas | 194/319 |
| 4,908,617 | 3/1990 | Fuller | 340/932.2 |
| 4,936,436 | 6/1990 | Keltner | 194/318 |
| 4,967,895 | 11/1990 | Speas | 194/200 |
| 4,982,371 | 1/1991 | Bolan et al. | 365/228 |
| 5,025,141 | 6/1991 | Bolan | 235/472 |
| 5,029,094 | 7/1991 | Wong | 340/932.2 |
| 5,045,675 | 9/1991 | Curry | 235/441 |
| 5,088,073 | 2/1992 | Speas | 368/90 |
| 5,103,957 | 4/1992 | Ng et al. | 194/217 |
| 5,109,972 | 5/1992 | Van Horn et al. | 194/217 |
| 5,119,916 | 6/1992 | Carmen et al. | 194/210 |
| 5,266,947 | 11/1993 | Fujiwara et al. | 340/932.2 |

*Primary Examiner*—Donnie L. Crosland
*Attorney, Agent, or Firm*—Rick Martin

[57] ABSTRACT

A computerized parking meter uses an ultrasonic transducer to precisely measure the distance to a parked vehicle and to reset the parking meter to zero when the vehicle leaves. The computerized parking meter utilizes low power and may be recharged by solar power. The computerized parking meter can be programmed with differing rates, calendar days, advertising and alarms. Unlocking the coin box requires both the proper computer code and a key. When the computerized parking meter receives the proper computer code a solenoid is activated which retracts a plunger allowing the key to unlock the coin box. A coin discriminator allows only proper coins to be inserted into the meter. Audible messages and alarms can be sounded and written messages displayed. A portable terminal can communicate with a central computer to enhance collections security and identify repeat parking violators.

34 Claims, 9 Drawing Sheets

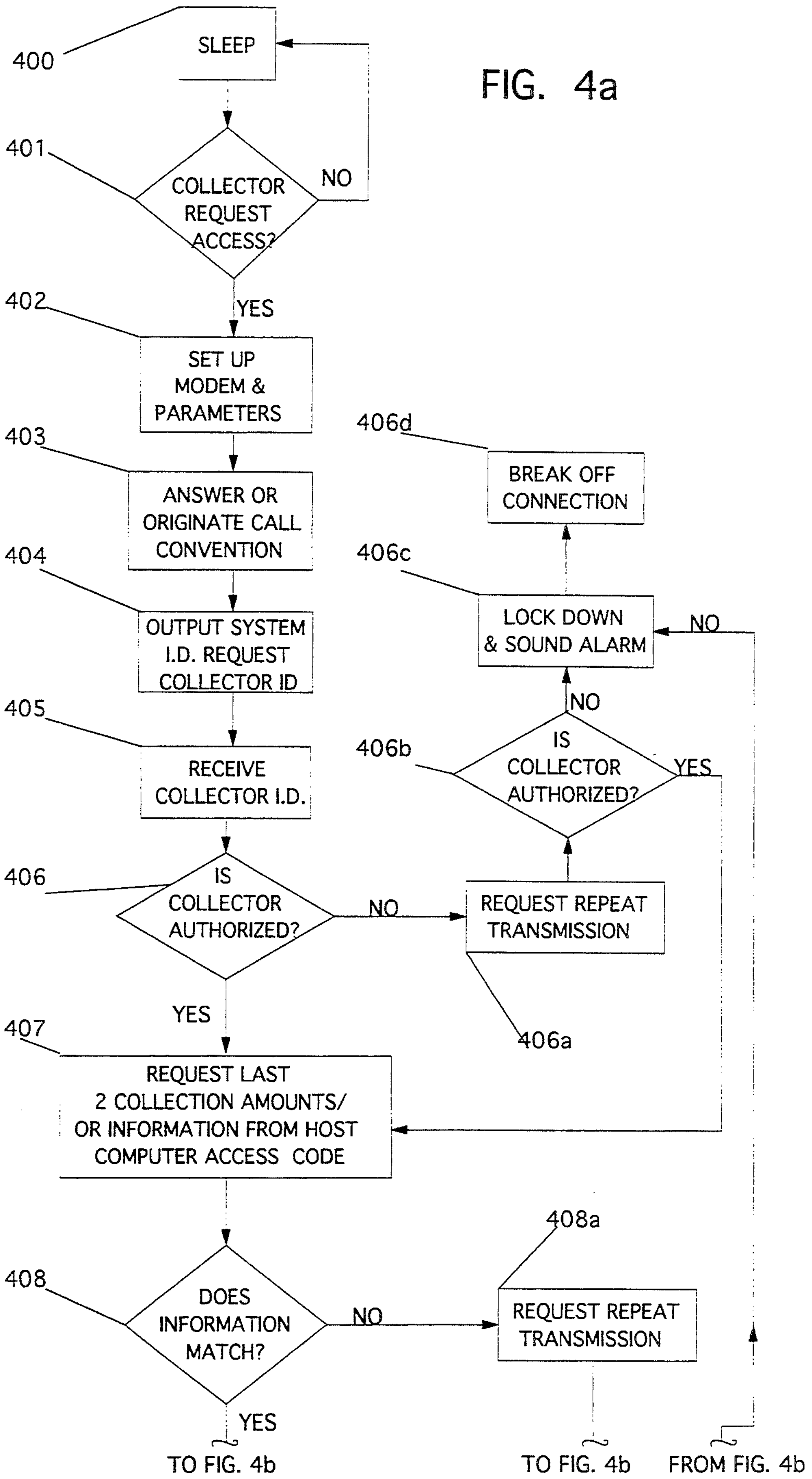

SLEEP
400
FIG. 4a
401
COLLECTOR REQUEST ACCESS?
NO
YES
402
SET UP MODEM & PARAMETERS
403
ANSWER OR ORIGINATE CALL CONVENTION
404
OUTPUT SYSTEM I.D. REQUEST COLLECTOR ID
405
RECEIVE COLLECTOR I.D.
406
IS COLLECTOR AUTHORIZED?
NO
REQUEST REPEAT TRANSMISSION
406a
406b
IS COLLECTOR AUTHORIZED?
YES
NO
406c
LOCK DOWN & SOUND ALARM
NO
406d
BREAK OFF CONNECTION
YES
407
REQUEST LAST 2 COLLECTION AMOUNTS/ OR INFORMATION FROM HOST COMPUTER ACCESS CODE
408
DOES INFORMATION MATCH?
NO
408a
REQUEST REPEAT TRANSMISSION
YES
TO FIG. 4b
TO FIG. 4b
FROM FIG. 4b

COMPUTERIZED PARKING METER

CROSS REFERENCE PATENTS

U.S. Pat. No. 4,936,436 (1990) to Keltner is incorporated herein by reference. U.S. Pat. No. 4,982,371 (1991) to Bolan et al. is incorporated herein by reference. U.S. Pat. No. 5,025,141 (1991) to Bolan is incorporated herein by reference. U.S. Pat. No. 5,045,675 (1991) to Curry is incorporated herein by reference.

FIELD OF THE INVENTION

The present invention relates to computerized maximum revenue producing parking meters.

BACKGROUND OF THE INVENTION

Carlton Cole Magee designed the original parking meter in 1935. The parking meter's purpose was to generate revenue and control traffic. The majority of parking meters in use today use the Magee design. Throughout the years since Magee's design an effort has been made to provide an automatic reset system for parking meters. It has become accepted that such an embodiment would substantially increase revenues 50% to 200%.

Throughout the years municipalities have requested specific evolutionary changes for improving the parking meter. The major changes relate to reducing pilferage, increasing revenue, and lowering operating costs in light of a $2.3 billion annual U.S.A. revenue stream.

The prior art teaches means to reduce pilferage including advanced tumbler key locks and digital security codes. The present invention combines the best advanced tumbler key lock with a unique algorithmic key for each parking meter. The key is based on the total of the last three coin collection counts. Furthermore, a portable terminal creates an audit trail for coins collected.

For increasing revenue the prior art teaches maximum revenue producing (MRP) parking meters. Various vehicle detection means noted below provide the automatic reset of the unexpired time to zero upon the vehicle's departure. However, problems exist with the prior art in distinguishing pedestrians from vehicles and/or distinguishing plastic vehicles. The present invention provides exact vehicle to parking meter distance calculations using an ultrasonic sensor. Additionally the present invention uses a window concept to discern pedestrians from parked cars. This method eliminates pedestrian/vehicle confusion and readily senses plastic or metal vehicles.

In order to reduce operating costs the present invention utilizes a low power (under 250 milliamps) design, with a sleep mode real time computer, and a solar recharger. A seven year expected battery life is forecast.

In order to best view the advantages of the present invention a summary of the most relevant prior art follows below.

SUMMARY OF THE PRIOR ART

U.S. Pat. No. 4,936,436 (1990) to Keltner discloses a coin acceptor which prevents the coin from leaving the customer's hand unless the coin develops a null voltage between coils in the acceptor, thereby verifying that the coin is proper. An electronic pulse is sent to a coin counting circuit.

U.S. Pat. No. 4,982,371 (1991) to Bolan et discloses a very compact electronic module which includes an integrated circuit (preferably including memory) and a battery. The module is preferably coin-shaped, and the two faces of the module are isolated from each other. The module contains logic to perform serial transfer of the whole memory content on command. Host systems can read/write access such modules by using a one-wire-bus protocol.

U.S. Pat. No. 5,025,141 (1991) to Bolan discloses a hand-held wand for providing rapid contact to and reading of two-terminal electronic token data modules. The hand-held wand includes one contact which will make contact to the periphery of an electronic token which the wand is pressed against, and one contact which will make contact to the center of the token.

U.S. Pat. No. 5,045,675 (1991) to Curry discloses a serial port signal interface to a low-cost portable electronic token data module. The signal interface can be used with a wide variety of computers as long as the computer includes an interface to RS232 (or some comparable standard). The token has a one-wire bus interface, implemented in a battery-backed open-collector architecture, which provides a read/write interface. The communication protocol expected by the token has been specified so that the token never sources current to the data line, but only sinks current. The communication protocol also includes time-domain relations which are referenced to a very crude time base in the token, and the system must preserve timing relations which will be satisfied by tokens in which the time base takes on any of the wide range of foreseeable speeds. To interface to this protocol, the programmable capabilities of the standard UART chip in the computer's RS232 interface are exploited to provide adaptation to the time base requirement of the module.

U.S. Pat. No. 3,486,325 (1969) to Cochran et discloses a reset mechanism for parking meters with a mechanical clock which can be activated by a bellows triggered by a pressure impulse.

U.S. Pat. No. 3,535,870 (1970) to Mitchell discloses a parking meter controller for attachment to a standard mechanical parking meter that returns the meter to zero upon departure of a vehicle from the parking space. The controller comprises an ultrasonic transmitter and a receiver for reflected ultrasonic energy. Upon removal of the vehicle and absence of ultrasonic reflections, the meter is actuated to return to zero. The controller does not return the meter to zero until a plurality of ultrasonic bursts are transmitted without reception of corresponding echo signals. The controller is energized upon actuation of the meter by insertion of money and the controller is deactivated when the meter is returned to zero, so the controller is only activated when needed and conserves energy.

U.S. Pat. No. 3,999,372 (1976) to Welch et al. discloses a parking meter control unit for a mechanical meter comprising an ultrasonic transmitter and receiver system which senses the presence of a parked vehicle and returns the time on the meter to zero when the vehicle is driven away. The control unit also prevents anyone from inserting coins into the meter after an initial parking time interval has expired.

U.S. Pat. No. 4,031,991 (1977) to Malott discloses an electronic dual counter parking meter. A display turns off after initial coin insertion. This prevents subsequent users from using the unexpired time since they don't know how much time is remaining.

U.S. Pat. No. 4,043,117 (1977) to Maresca et al. discloses a light sensing photodiode in a parking meter.

When the meter is activated by a coin the photodiode measures the light from the parking space. When the parked car leaves the photodiode resets the meter to zero. An SCR gate and capacitor circuit is used to prevent reset when a pedestrian walks between the parking meter and the parked vehicle.

U.S. Pat. No. Re. 29,511 (1978) to Rubenstein discloses a metal detector in a parking meter. When the parked car leaves the metal detector resets the meter to zero. Battery drain is minimized by shutting off the computer at reset time. The computer has a clock and a down counter for time remaining. A visual display of time remaining is included.

U.S. Pat. No. 4,167,104 (1979) to Bond discloses a solenoid enabled draw lock for securing a cabinet door to a vending machine cabinet. A door-mounted solenoid actuated dead bolt extends through coaxial apertures in the lock housing, lock cylinder and handle to permit extension of the lock handle only when the solenoid is retractably energized by a separate key or decoding device and otherwise restrains the handle in its retracted position.

U.S. Pat. No. 4,823,928 (1989) to Speas discloses a microprocessor controlled electronic parking meter system having a sonar range finder (such as an air ultrasonic transducer) connected to a microprocessor in the meter which detects the presence or absence of, or distance to, a parked vehicle. The electronic parking meter also comprises a hand held auditor for supplying information and programming (such as changing the amount of time per coin inserted) to the meter and collecting data from the meter. The auditor may be connected to the microprocessor in the meter by a cable or by infrared transmission. The microprocessor has a power-up mode, a standby mode and an operational mode.

U.S. Pat. No. 4,825,425 (1989) to Turner discloses a parking meter reset device using an infrared transmitter and detector for resetting the meter when the parked car is moved. If either the transmitter or receiver is blocked, the parking meter functions like a non-resetting meter. The transmitter and receiver draw power only during brief pulses at intervals to minimize power requirements.

U.S. Pat. No. 4,827,206 (1989) to Speas discloses a solar power system for electronic parking meters. Storage capacitors may be charged by solar power, an external power source or an auxiliary battery.

U.S. Pat. No. 4,829,296 (1989) to Clark et al. discloses an electronic-lock system suitable for parking meters comprising an access device and electronic locks in which each locking device has a unique identification code and a unique access passcode, and the portable access device includes means for receiving the particular identification code and providing the associated access code necessary to open the lock.

U.S. Pat. No. 4,872,149 (1989) to Speas discloses a microprocessor controlled electronic advertising system for parking meters. The microprocessor stores messages and displays or scrolls the message on a liquid crystal display (LCD). Time remaining on the meter is also displayed.

U.S. Pat. No. 4,895,238 (1990) to Speas discloses a microprocessor controlled coin discriminator for electronic parking meters utilizing an inductor to discriminate between coins. The invention can be adapted to receive paper money or credit cards.

U.S. Pat. No. 4,908,617 (1990) to Fuller discloses a parking stall monitor for restricted use parking stalls transmitting bursts of ultrasonic pulses and detecting the reflection off a vehicle in the parking stall. The monitor can provide a number of audible warnings to indicate that use of the stall is restricted. The parking stall monitor can be selectively disarmed and rearmed by a signal transmitted from a portable transmitter within an authorized vehicle. The parking stall monitor can transmit a warning RF signal to a central location and/or trigger an autodialer.

U.S. Pat. No. 4,967,895 (1990) to Speas discloses a parameter control system for an electronic parking meter including circuits for controlling changeable parameters such as temperature drift, low voltage levels and aging.

U.S. Pat. No. 5,088,073 (1992) to Speas discloses an electronic parking meter having a highly visible viewer display driven by a microprocessor controlled magnetic pulse circuit.

U.S. Pat. No. 5,103,957 (1992) to Ng et al. discloses an electronic parking meter with money receiving means, a movable output member, money signal generating means, means for processing including time generating means, and an interface permitting wireless communication with an external device.

U.S. Pat. No. 5,109,972 (1992) to Van Horn et. al. discloses a coin operated timing mechanism for a parking meter with a time display, a microprocessor and battery power source, a power regulation sub-system to minimize power consumption including a switch actuated low power drain feature, and coin actuated switches.

U.S. Pat. No. 5,119,916 (1992) to Carmen et al. discloses Hall effect sensors for measuring the magnetically responsive characteristics of tokens and coins suitable for use in parking meters.

SUMMARY OF THE INVENTION

The main object of the present invention is to provide a parking meter having a reliable automatic reset system utilizing a precise vehicle distance sensor using a window algorithm.

Another object of the present invention is to provide a parking meter with a computer having a security algorithm based on prior coin collections which is controlled by an interface to a portable terminal.

Another object of the present invention is to provide the portable terminal with communications to a central computer which stores data including scoff law ticket violators.

Another object of the present invention is to provide a parking meter with a credit card interface.

Another object of the present invention is to provide a parking meter with a computer having programable alarm, rate, calendar, and advertising means.

Another object of the present invention is to provide a parking meter with a computer and peripherals which utilize low consumption of battery power thereby allowing recharging by solar power.

Other objects of this invention will appear from the following description and appended claims, reference being had to the accompanying drawings forming a part of this specification wherein like reference characters designate corresponding parts in the several views.

The on board computer is a real time system with a sleep and idle mode and a continuously running real time clock. The clock also functions as a calendar. An electronic coin counter interrupts the sleeping computer upon coin insertion. A counter is activated. The rate is calculated based on time, day of the week and date. An ultrasonic sonar sensor is used to compute the vehicle's distance from the parking meter. Intervening pedestrians are ignored because the computer utilizes a window algorithm, thereby computing that they are closer than the parked vehicle.

Power is conserved by intermittently scanning for the vehicle's presence. When the vehicle leaves, the computer resets to zero and returns to sleep mode. Overtime violators set off an alarm.

A meter maid carries a portable terminal. The meter maid must enter her own ID plus the coin count of the prior three collections in order to access the coin box. After collecting the coins the computer erases the oldest coin count and adds the newest coin count. This total may be made to match the meter maid's entry. Changeable rates can be down loaded and data collected on usage.

The computer senses the return of the coin box and reinitiates its sleep mode.

The meter maid's portable terminal can communicate to a central computer having a database of suspicious license plates.

A credit card reader may be mounted on the parking meter.

A Touch Memory TM token may be utilized to store customer credit. The computerized parking meter may read the Touch Memory TM token, validate the authorization and subtract the credit used from the preauthorized amount. The computerized parking meter can also display the credit balance remaining on the Touch Memory TM token.

A solar cell recharges the batteries enabling approximately a seven year life.

Before explaining the disclosed embodiment of the present invention in detail, it is to be understood that the invention is not limited in it's application to the details of the particular arrangement shown, since the invention is capable of other embodiments. Also, the terminology used herein is for the purpose of description and not of limitation.

DETAILED DESCRIPTION OF THE PREFERRED EMBODIMENT

Figure 1:
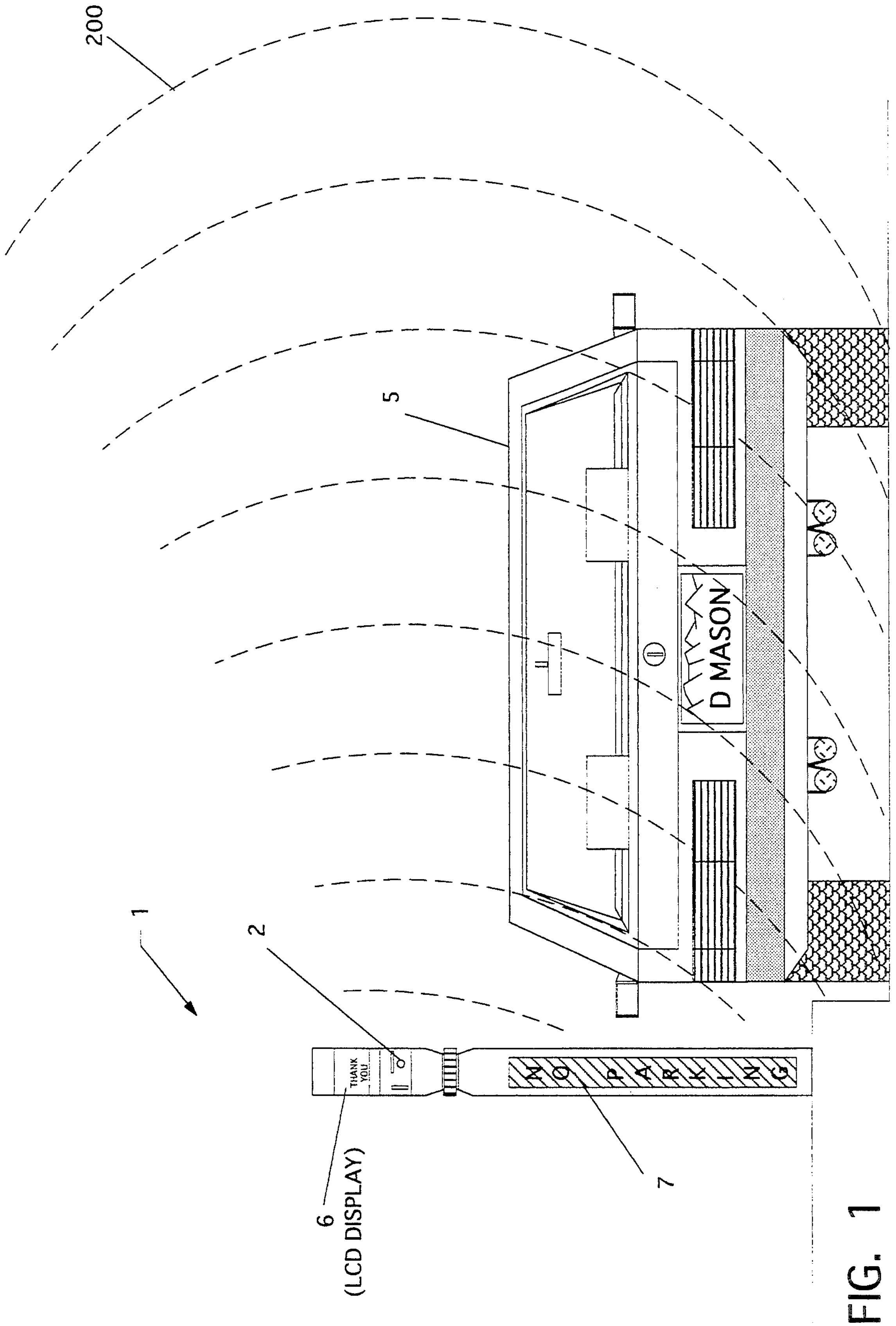
FIG. 1 is a front plan view of a parking meter and a parked car.

Referring first to FIG. 1 a computerized parking meter has an ultrasonic transducer 2. Ultrasonic transducer 2 transmits periodic bursts of ultrasonic waves 200 and receives the reflected waves which bounce off parked car 5. The time delay in receiving the reflected ultrasonic waves enables a microprocessor (not shown) to compute the distance between the computerized parking meter 1 and the parked car 5.

The computerized parking meter 1 measures the distance from the meter to a random point on the parked car 5 (or motorcycle). The computerized parking meter 1 is programmed to recognize a "window" of distances to the parked car 5 based on the time delay algorithm. The window has a minimum distance equal to the minimum distance between the computerized parking meter 1 and the parked car 5. Thus pedestrians, bicycles and other obstructions between the computerized parking meter 1 and the parked car 5 are not recognized as parked vehicles. The maximum distance within the window is variable and can be programmed. A positive baseline distance is established to the parked car 5 only if the distance measured is within the defined window and remains stable over multiple test cycles. The distance to the parked car 5 is checked several times per minute, preferably 4 to 6 times per minute. If the new reading of distance is less than the baseline distance to the parked car 5 (as from a pedestrian walking between meter and vehicle) then the reading is ignored. If the new reading of distance is greater than the baseline distance to the parked car 5, and if the new reading is confirmed by rechecking over multiple test cycles, then the microprocessor 10 (FIG. 2) recognizes the parked car 5 has left and resets the computerized parking meter 1 time to zero.

The microprocessor 10 is always in a sleep mode (to conserve power) except during power-on and operational modes. Power-on mode is triggered when the computerized parking meter 1 is first turned on and/or is first connected to power. Power-on mode continues until the system is initialized. Operational mode is triggered when a coin 30 (FIG. 2) (or other methods of payment) is inserted, when the distance to the parked vehicle is being checked, and when the computerized parking meter is communicating, such as when a meter maid seeks access to the coin box.

The computerized parking meter 1 displays instructions and time remaining on an LCD 6. Other means (not shown) such as an LED can also be utilized. The LCD 6 can display advertising messages, scroll advertising messages and display the time remaining and overtime parking. Time remaining can, if desired, be blanked out and displayed upon the push of a button. For overtime parking violations, the LCD 6 can be programmed to flash, preferably about 6 times per second. This is advantageous in that the human eye can detect a flashing object at great distances, while the human eye has difficulty reading an LED or LCD at any significant distance. The computerized parking meter 1 can be programmed to activate a notice sign 7 which can display a no parking sign (for street cleaning or restricted times or days) or other messages (such as Seasons Greetings or a parking meter emblem). Notice sign 7 is preferably a low-amp display, such as an LCD or a back-lit display with a low-amp bulb.

Figure 2:
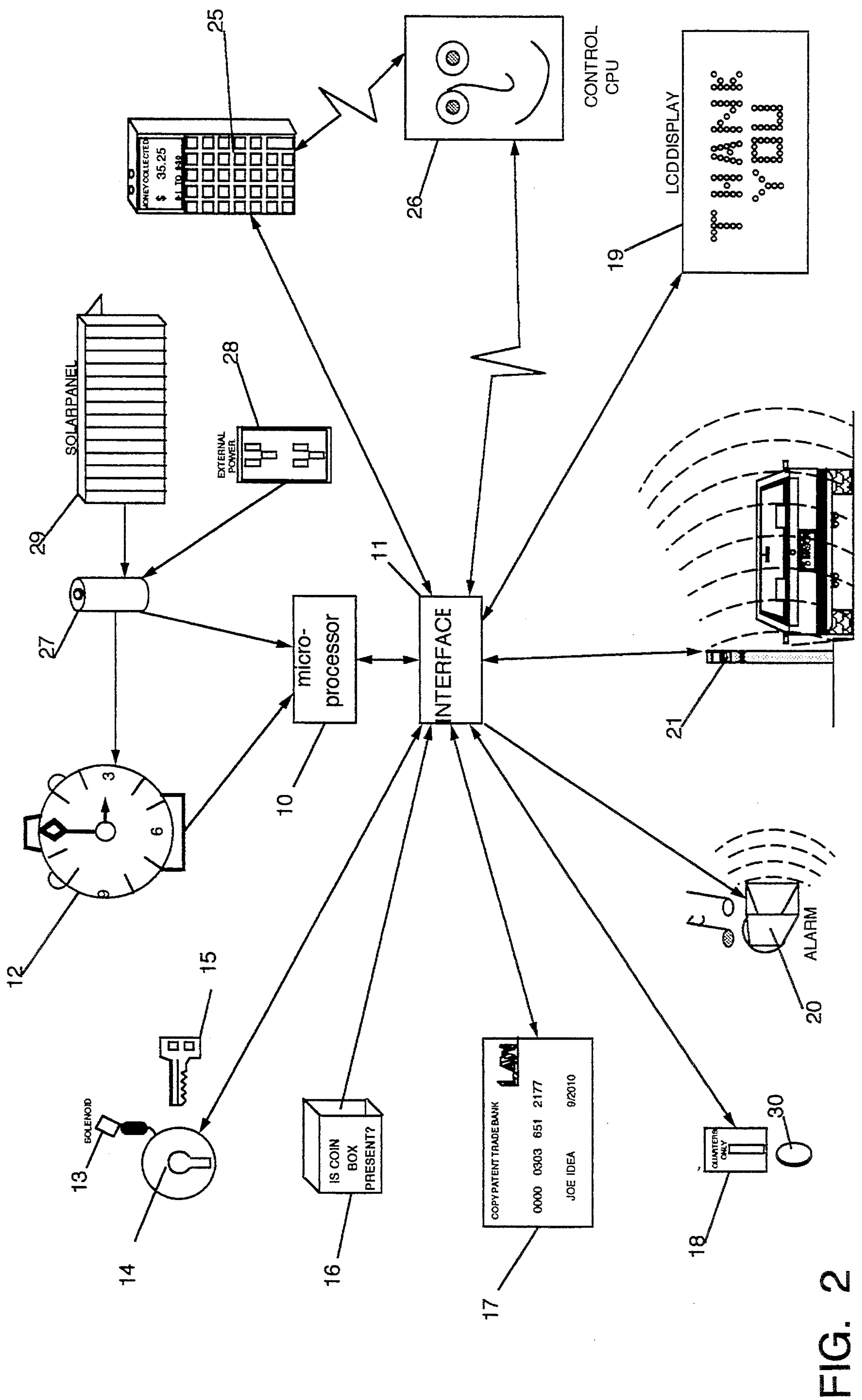
FIG. 2 is a schematic of the computerized parking meter

Referring next to FIG. 2 a schematic of the interrelationship of the various parts of the computerized parking meter 1 is shown. A microprocessor 10 communicates with interface 11. Microprocessor 10 is connected with a separate battery-backed real time clock 12 with interrupt and alarm capabilities. The interface 11 also includes a programmable interval timer (not shown). These features are utilized to allow the computerized parking meter 1 to operate in a real-time environment. Interface 11 also provides for power-on, sleep and operational modes. Embodiment of the sleep mode hardware is known in the art and used in products such as the Advanced Micro Devices®(AMD®) 286ZX/LX-16, the Intel® IPAX 486SL and 82360SL subsystem chip set, and the Dallas Semiconductor® model DS5000T. The above devices require software process control and command embodied in this disclosure to implement them. A watch dog timer is implemented that must be periodically reset. This feature assures the system works properly by reinitializing the system should a malfunction occur.

The parking meter process discussed herein requires that the microprocessor or microcontroller used meet the following minimum requirements:

1) Central Processing Unit (CPU)
2) ROM/RAM Memory
3) Memory Map Decoder
4) System timing including a regulated oscillator
5) Serial I/O
6) Parallel I/O
7) Interrupt Controlled
8) Power Management Logic
9) Real Time Clock
10) Interval Timer
11) Bus Controller A Touch Memory TM token with built-in real time clock can serve as timekeeper and alarm to interrupt the microprocessor or time stamp transactions.

Chips known in the art to meet these requirements include the Intel® Corp. IPAX 486SL and 82360SL subsystem (chip set), the Advanced Micro Devices® AM286ZX/LX-16 and the Dallas Semiconductor® model DS5000T.

The interface 11, upon receipt of the proper codes from the portable terminal 25, provides power to energize solenoid 13 and lift a plunger (not shown) above the inner cylinder of computer activated lock 14, thus enabling the key 15 to unlock computer activated lock 14.

Interface 11 enables the operational mode to be activated by a credit card 17 or by depositing coin 30 (or a token) in coin acceptor 18. A Touch Memory TM token may be utilized to store customer credit. The computerized parking meter may read the Touch Memory TM token, validate the authorization and subtract the credit used from the preauthorized amount. The computerized parking meter can also display the credit balance remaining on the Touch Memory TM token.

The interface 11 can activate a LCD display 19 to give instructions to users or to display messages upon the deposit of a coin 30. The interface 11 can also flash the LCD 19 when parking meter time has expired. A flashing LCD 19 (or a flashing LED) is advantageous and preferred for attracting the attention of a meter reader. Interface 11 can also activate an alarm speaker 20 to play musical tunes or state messages upon the deposit of coin 30. Alarm speaker 20 can also be activated to sound when time expires. Other alarms (not shown) such as the notice sign 7 (FIG. 1), a flash strobe, an acoustic transmitter, a microwave transmitter or a radio frequency transmitter can also be activated to notify the meter maid when purchased parking time expires. Alarm speaker 20 or other alarms can also activate if coin box 16 is removed without authorization.

The microprocessor 10 can receive a temperature readout from a temperature measuring device (not shown) and utilize an algorithm to look up table data and apply a correction factor to all distance measurements and window distances and all time measurements. Alternatively, the correction factor can be computed via formula and the correction factor applied. This enables accurate distances to be determined even though air density and the speed of sound increases at colder temperatures. In addition, all oscillators slow down somewhat in the cold (typically, 6–10 seconds per month at 0° F. and 1–3 minutes per month at −40° F.). Thus, accurate time readouts can be maintained at varying temperatures.

Interface 11 sends signals to and receives signals from the ultrasonic transducer 21, enabling microprocessor 10 to determine whether the parked car 5 is present or whether time should be reset to zero.

Portable terminal 25 can communicate with interface 11 via acoustic, infrared, microwave, RF signals, a cable or Touch Memory TM (Dallas Semiconductor®).

Figure 7:
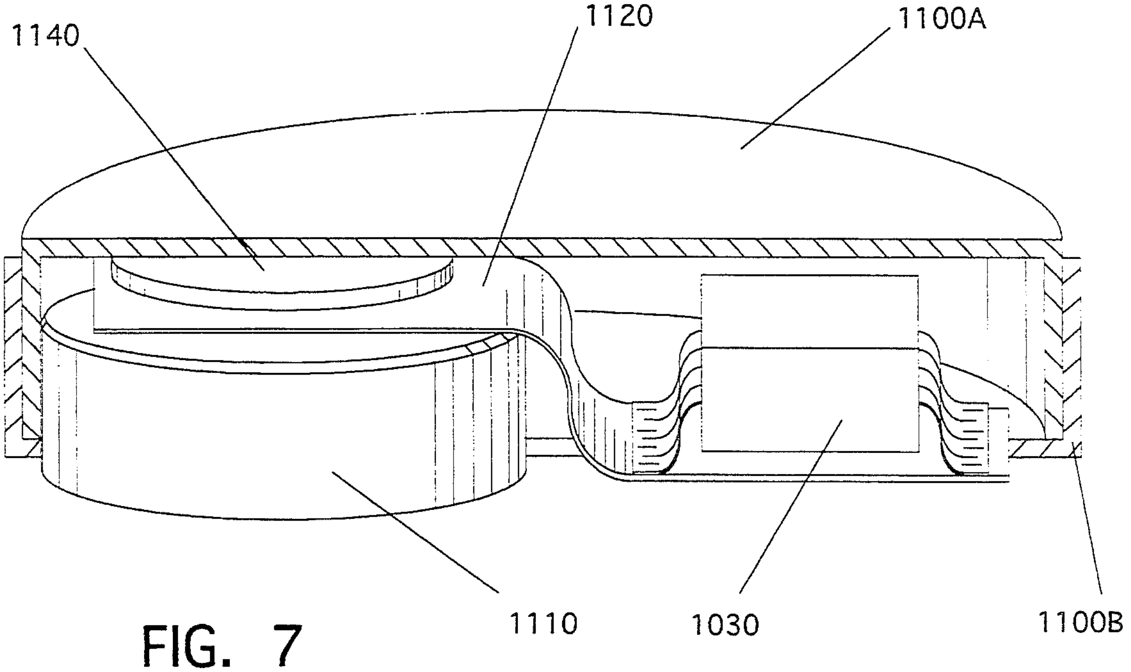
FIG. 7 is a top front perspective view of the Touch Memory TM electronic module showing a version using a packaged integrated circuit on a flexible circuit board.

Referring next to FIG. 7 Touch Memory TM utilizes a integrated circuit 1030 in a low height package (such as a flat-pack or SOIC) contained in a stainless steel container 1100 (MicroCan TM) consisting of an inner casing piece 1100A and outer casing piece 1100B to transfer data. Laterally spaced from the integrated circuit 1030, on the other end of the small flexible printed circuit board 1120, the board end is sandwiched between a battery 1110 and a piece of elastic conductive material 1140 (such as conductive plastic foam). Thus, the battery 1110 is connected between one face 1100B of the container 1100 and a power conductor (not shown) on the board 1120. The piece of elastic conductive material 1140 makes contact between a data trace (not shown) on the board 1120 and the other face 1100A of the container 1100. Another trace (not shown) on the board 1120 makes contact directly to the container face 1100B on which the battery's ground terminal is connected. Thus, simple wiring on the small board 1120, using through-holes vias, suffices to route power, ground, and data lines to the integrated circuit 1130, while providing a sealed durable package with two external contacts. The Touch Memory TM system is described in U.S. Pat. No. 4,982,371 (1991) to Bolan et al., U.S. Pat. No. 5,025,141 (1991) to Bolan and U.S. Pat. No. 5,045,675 (1991) to Curry, all of which are incorporated herein by reference.

The Touch Memory TM system can read or write data with a momentary contact (i.e., by touching the portable terminal 25 to the computerized parking meter 1). Communication to a host is via a single signal plus ground at 16K bits/sec. bidirectional data transfer rate. Data integrity is insured by use of CRC's, scratchpad, verification and page writes via an uninterruptiple copy command. The system is available with calendar date and time, interval timer, and access counter. The two-terminal Touch Memory TM electronic module is extremely compact, rugged and extremely cheap. Each Touch Memory TM includes a unique, factory lasered 48-bit serial number which can be utilized as an identification number for the computerized parking meter 1.

Portable terminal 25 can exchange ID code with the computerized parking meter 1, transmit the proper access code (and thus allow key 15 to open computer activated lock 14), create and transmit a new access code (preferably based on a record of the number of deposited coins collected), create an audit trail and calculate any commission due the meter maid. Portable terminal 25 is also used to synchronize the real time clock 12 at the time of collection. Portable terminal 25 can also communicate with a central control CPU 26 to receive access codes or to notify a central location of license plate numbers so that appropriate action can be taken with scofflaw violators or with parked stolen cars.

In one embodiment the central control CPU 26 can be located in a supervisor's office and assign authorization to collect from or perform maintenance on computerized parking meters. In the field and in communication with a parking meter, the portable terminal 25 will seek permission to proceed from the central control CPU 26. After verifying the authority of personnel, the central control CPU 26 will request serial number or other meter identity code, download the access codes to energize solenoid 13 and allow a coin collector person to use key 15 to unlock computer activated lock 14 and gain access to coin box 16. The central control CPU 26 may also establish the new code, which can be based on the number of coins collected, allowing the audit trail or the most recent portion thereof to function as an authorizing code. Other data, such as peak usage times, days, and places can be determined.

For small systems it is least expensive to operate communications between portable terminal 25 and central control CPU 26 via cellular telephone. Cellular computers are known in the art, such as the unit sold by Intelligence Technologies®. Larger systems would preferably use FM band radio communication. This requires a base system transmitter. Portable computers with an FM radio band system, such as the Motorola® KDC 870, are known in the art.

The microprocessor 10 and interface 11 are preferably powered by a battery 27 (or a group of batteries) which can be recharged by either an external power source 28 or a solar panel 29. External power source 28 can be combined with portable terminal 25 to allow recharging at the time of coin collection if recharging is needed.

The microprocessor 10 and interface 11 can change parking prices at various times of day, can allow free parking on selected days such as holidays and can refuse to accept money at selected times or days (such as street cleaning days). Such information can be downloaded and/or changed by the portable terminal 25.

Figure 3A:
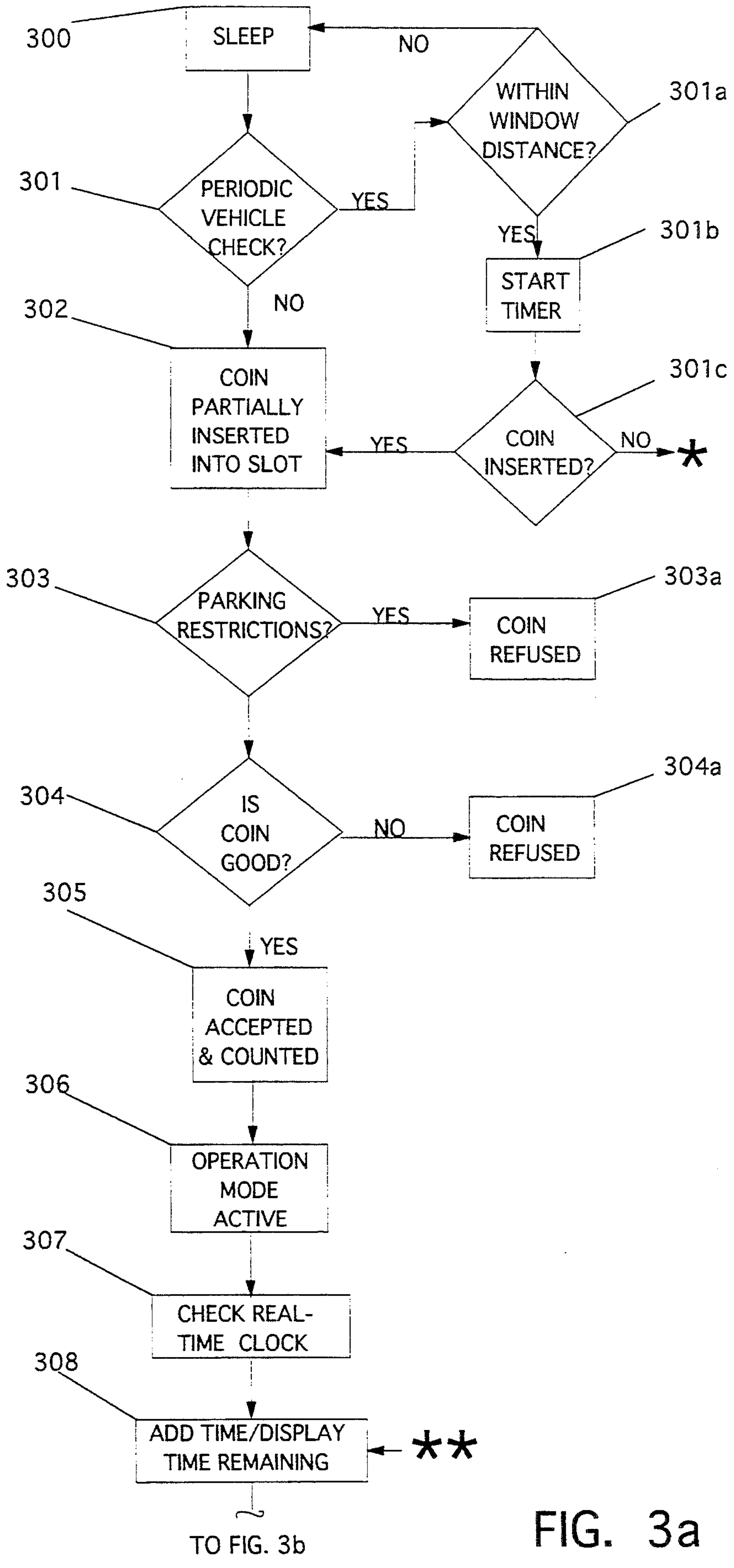
FIGS. 3(*a*). 3(*b*) and 3(*c*) are a logic flow chart illustrating the operation of the computerized parking meter.
Figure 3B:
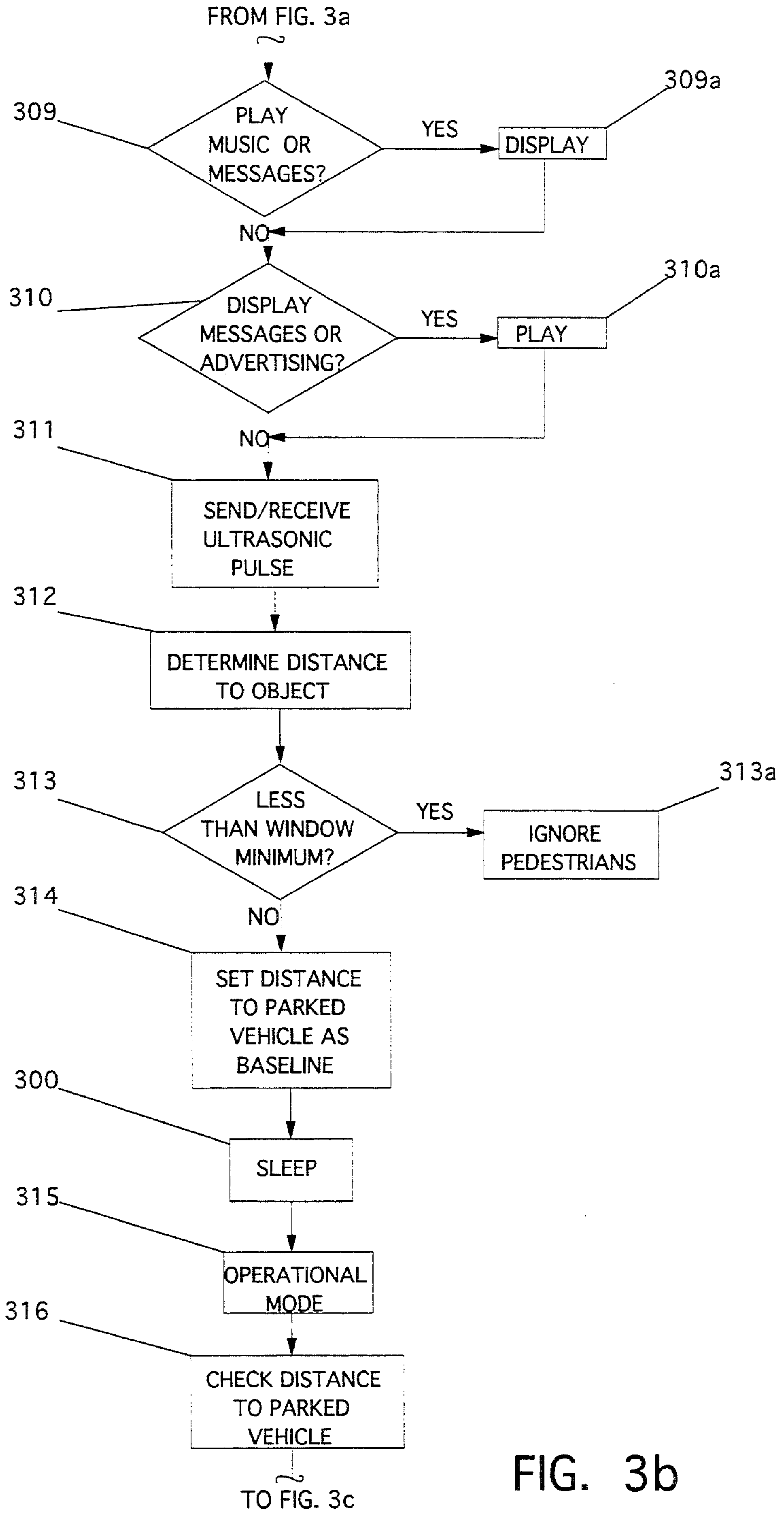
Figure 3C:
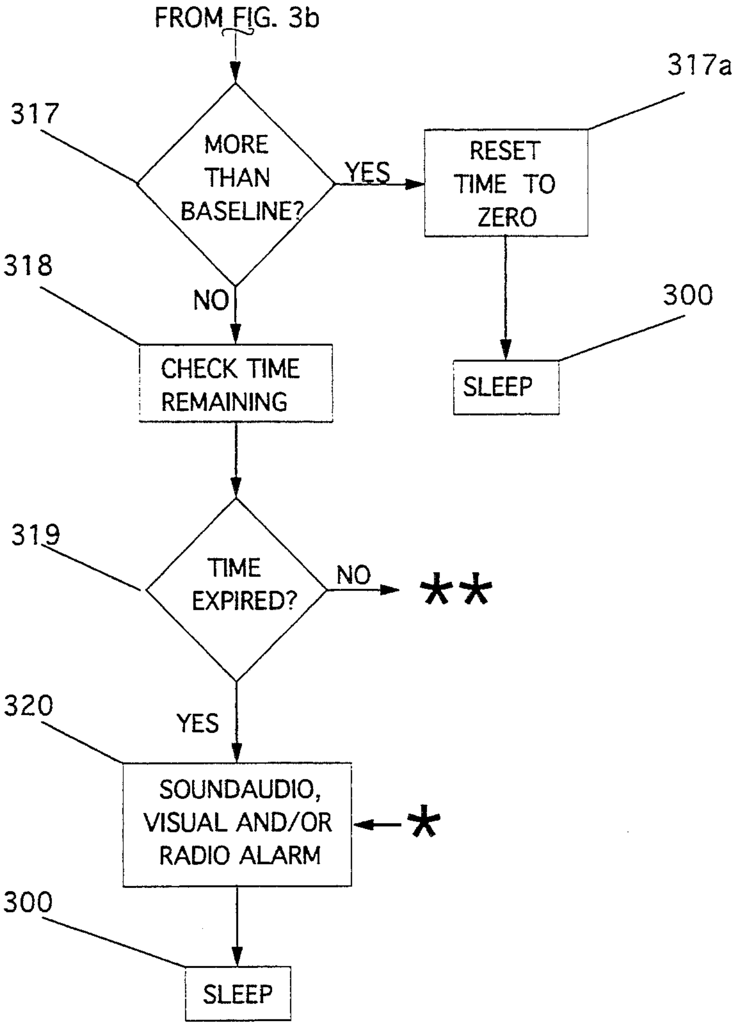

Referring next to FIGS. 3(*a*), 3(*b*) and 3(*c*) a logic flow chart shows the processes carried out by the computerized parking meter 1. If desired, the computerized parking meter 1 can leave sleep mode (functional block 300) and make periodic checks (functional block 301) to see if a vehicle is within the recognized distance "window" (test block 301*a*) and start a timer (functional block 301*b*) to allow time to insert a coin (test block 301*c*) if a parked car 5 is present. If no coin is inserted within the allowed time, the alarm is displayed, sounded, and/or transmitted to a meter maid or central location (functional block 320). This feature is also adaptable to use within loading zones, where a credit-type card or a Touch Memory™ credit token can be used to allow authorized personnel to load, but only for a limited time per day, and alarms are triggered if this time is exceeded or unauthorized vehicles are in the loading zone. The push coin acceptor allows the coin 30 to be partially inserted (functional block 302). The computerized parking meter 1 checks to see if it is a holiday, streetcleaning day, or other restricted parking time (test block 303). If so the coin is rejected (functional block 303*a*). If parking is allowed, then the coin 30 is tested (test block 304). If the coin 30 is not validated as a proper coin, it is rejected by the coin acceptor 18 and cannot be completely inserted (functional block 304a). If the coin 30 is accepted, the coin counter is activated (functional block 305). The coin counter triggers the microprocessor to leave sleep mode and enter operational mode (functional block 306). The microprocessor checks the real time clock 12 (functional block 307), gives the amount of credit due for the money inserted based on the program for that day, date and time and displays the amount of time remaining on the LCD 6 or other display (functional block 308). Next any desired (test block 309) music or audible messages are played on the alarm system speaker (functional block 309*a*) and any desired (test block 310) visual messages or advertising are displayed on the LCD 6 and/or notice sign 7 (functional block 310*a*). The ultrasonic transducer 21 (preferably a Polaroid® 9000 series environmental transducer) sends a burst of ultrasonic waves 200 and receives the reflections from the parked car 5 or other object (functional block 311). The microprocessor determines the delay in receiving the reflections and calculates the distance to the parked car 5 or other object (functional block 312). If (test block 313) this distance is less than the minimum in the "window" (the programmed minimum distance between the computerized parking meter 1 and the parked car 5) due to pedestrians or due to bubblegum or snow blocking the ultrasonic transducer, then the reading is ignored (functional block 313*a*) and no baseline is determined. If the meter to car distance is more than the minimum programmed distance, then a baseline distance to the parked car 5 is determined and stored (functional block 314). The computer may also take a temperature reading from a temperature sensor (not shown). An algorithm is utilized to compensate for the variance of the speed of the ultrasonic waves as a function of temperature, thus allowing a precise distance to be determined at any temperature. The computer then goes into "sleep" mode (functional block 300) to conserve power until it is time to perform another distance check. The computerized parking meter 1 can be programmed for how often it makes the distance checks. Every 10 seconds is a reasonable period. Sleep mode can also be interrupted by insertion of another coin or by a meter maid seeking access to the coin box 16. After an appropriate interval, the microprocessor is interrupted to reestablish operational mode (functional block 315) and checks the distance to the parked car 5 (functional block 316). If this distance is more than the previously determined baseline distance (test block 317), the time remaining on the meter is reset to zero (functional block 317*a*) and the computerized parking meter 1 returns to sleep mode (functional block 300) until another coin is inserted. If this distance is less than or equal to the previously determined baseline distance, the computerized parking meter 1 does not reset, and proceeds to check time remaining (functional block 318). If (test block 319) time has not expired, then the computerized parking meter 1 displays time remaining (308) and repeats the loop of playing music or messages and/or displaying advertising or messages (which may be programmed to play and display only when a coin is inserted, and not each time distance is checked), and determining if the parked car 5 has left the parking space. If (test block 319) time has expired, the computerized parking meter 1 displays the time expired message (preferably flashing to attract the attention of a meter maid), and/or sounds an alarm, and/or notifies the central control CPU 26 (or a meter reader) that time has expired (functional block 320) while the parked car 5 is still parked. The computerized parking meter 1 then returns to the sleep mode (functional block 300). A customer wishing to purchase more time after expiration can either be prevented from purchasing more time by rejecting the coin or the customer can be made to pay for the time already used prior to purchasing additional time. In addition, total time sold to any one car can be restricted to a predetermined programmable maximum to promote greater turnover of the space.

Figure 4B:
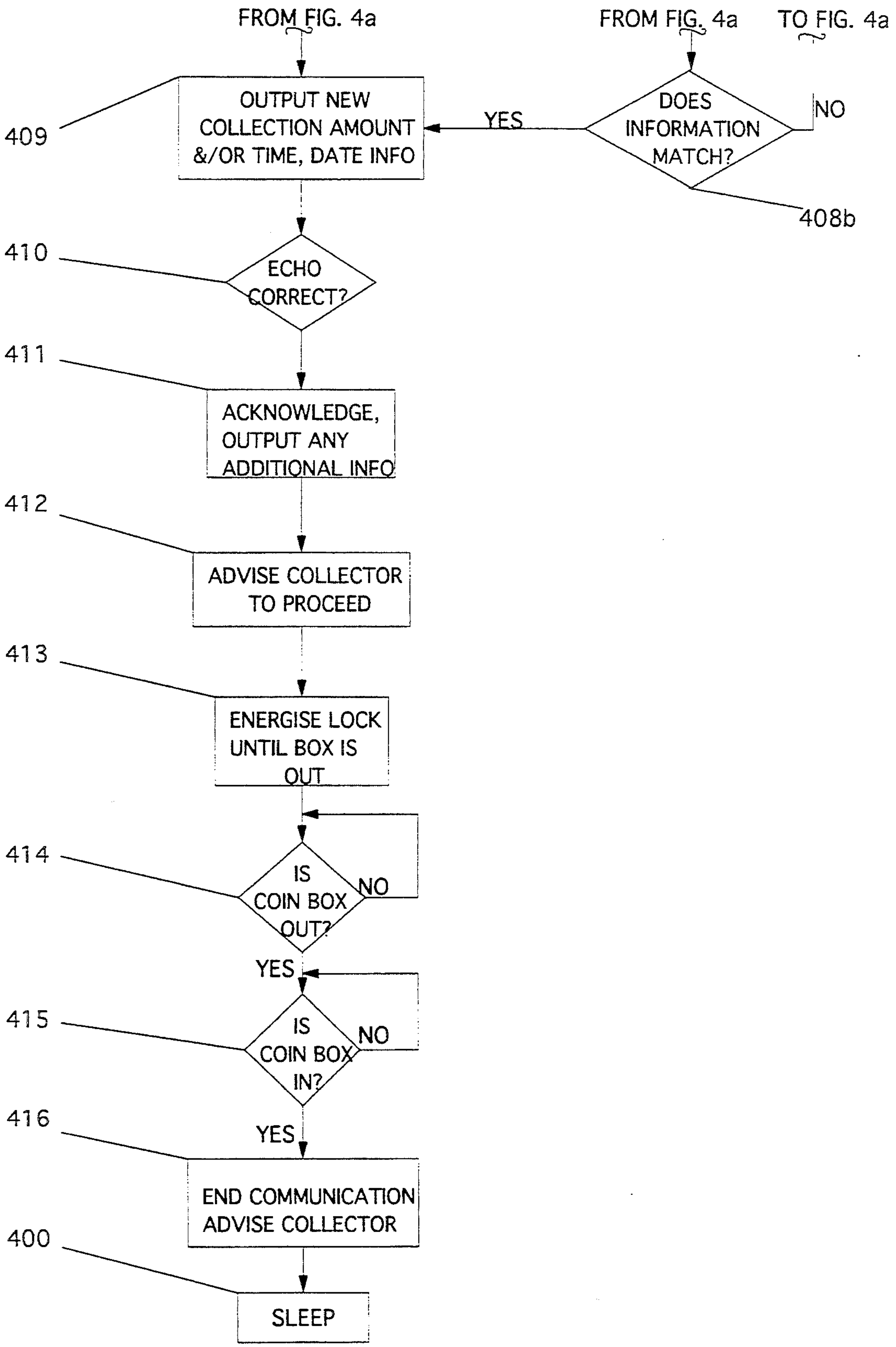
FIGS. 4(*a*) and 4(*b*) are a logic flow chart illustrating the computer activated lock system for coin collection.

Referring next to FIGS. 4(*a*) and 4(*b*) a logic flow chart shows the procedure whereby the microprocessor 10 of computerized parking meter 1 activates the lock system to allow access to the coin box 16.

The meter maid requests access (test block 401) from the initialized (sleep mode functional block 400) system. If collection is not authorized, then communication ends, the meter maid is notified, and the microprocessor 10 returns to sleep mode 400. Communication with meter maid can be via display, lights or tone. If the meter maid is authorized, the computerized parking meter 1 sets up the modem and parameters (functional block 402). Depending on the convention used, the computerized parking meter 1 either answers or originates the call convention (function block 403), transmits the ID number (serial number or other identifying number) and requests and receives the ID number of the meter maid (functional block 405). If (test block 406) the meter maid does not submit an authorized ID number, then the computerized parking meter 1 repeats the request for the ID number (functional block 406*a*). If an authorized ID number (test block 406*b*) is not received from the meter maid after the second request, the computerized parking meter locks down the coin box 16 and sounds an alarm (which can also be broadcast via radio) (functional block 406*c*), and breaks off communications (functional block 406*d*). If an authorized ID number is received, then the computerized parking meter 1 requests an authorized access code (preferably the last two or three collection amounts and/or times and dates) (functional block 407). If the access code is not authorized or the information does not match the record of collections (test block 408), then the computerized parking meter 1 repeats the request (functional block 408*a*). If (test block 408*b*) an authorized code is not received, the coin box 16 is locked down and the alarm is sounded (functional block 406*c*) and communications are broken off (functional block 406*d*). If an authorized access code (matching information) is received, then the computerized parking meter outputs the new collection amount and/or the time and day and/or any other information utilized in the access (functional block 409). After checking to make sure the echo of the information is correct (test block 410), the computerized parking meter acknowledges, outputs any additional information desired (functional block 411), and advises the meter maid to proceed (functional block 412). Again, communication with the meter maid can be via display, lights or tone. After advising the meter maid to proceed, the computerized parking meter energizes the solenoid on the lock until the coin box 16 is out (functional block 413). Only after the coin box 16 is removed (test block 414) and reinstalled (test block 415) does the computerized parking meter end communication and advise the meter maid (functional block 416) by means of the display, lights or tones. The computer then returns to sleep mode (functional block 400).

The advantages of this process include the meter maid being authorized to collect by knowing an authorized number to key in on the portable terminal 25, by being in a place at an authorized time (proper time and day), and by having a key. The host computer is authorized by recognizing the lock system ID number, by knowing at least the last two collection amounts and/or collection time and date of the lock system, and by echoing in new information. Additional advantages include automatic accounting with an audit trail history, elimination of the need to count money prior to banking, instant calculation of commissions or other payments, no computer operator necessary for the host, and a pilfer proof system.

The sequence for coin collection is: A) The meter maid establishes communication between the portable terminal 25 and the computerized parking meter 1. Communication may be via a cable, infrared transmission, acoustic transmission, microwave transmission, radio frequency transmission or Touch Memory TM. B) The computerized parking meter 1 announces its serial number; the portable terminal 25 transmits an access code consisting of how much money was collected from that particular serial number during the past three collection cycles. C) The computerized parking meter 1 confirms the data/code and downloads the latest amount to be collected. D) The new entry code is then automatically changed to reflect the next coming cycle by deleting the oldest entry and adding the present entry. E) The microprocessor 10 then releases the solenoid 13 allowing the meter maid to turn the high security key 15, gaining entry to the coin box 16. F) The key is turned one quarter turn, disengaging the DZUS ® fitting and allowing the meter maid to remove the coin box 16 and collect the money. G) The meter maid is obliged to re-insert and properly lock the coin box 16 prior to disengaging the portable terminal 25 and completing the sequence.

Figure 8:
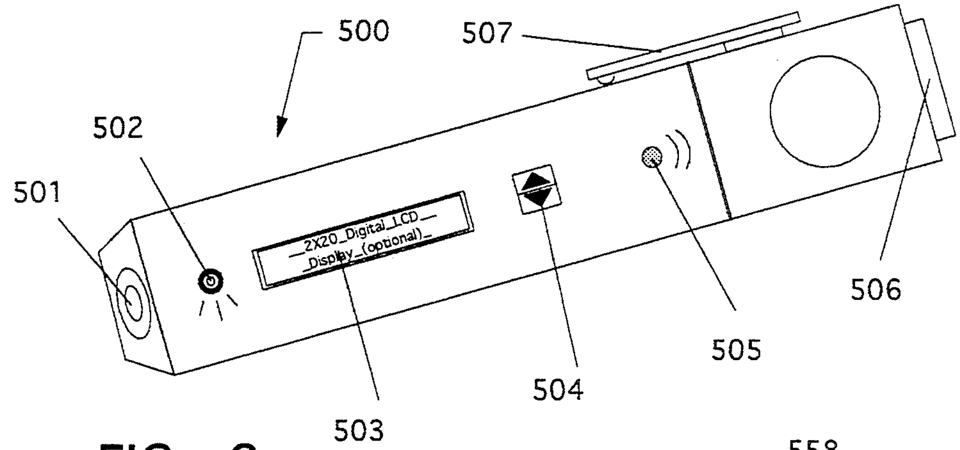
FIG. 8 is a left front perspective view of a pen-shaped mobile reader for touch transfer of data.

Referring next to FIG. 8 a Touch Pen 500 for collecting data from multiple, dispersed computerized parking meters via Touch Memory TM is shown. Touch Pen 500 has a Touch Probe 501 which collects data from multiple Touch Memories and stores it in up to 128K bytes of nonvolatile memory. Touch Transporters (not shown) are a high-capacity Touch Memory TM that can act as a data dump for the Touch Pen 500 if necessary. Touch Probe 501 can also be used to provide a datalink for reprogramming computerized parking meter 1 if desired. When the data is logged in the Touch Pen 500, LED 502 blinks and beeper 505 sounds to signal the meter maid that the transaction is complete. An optional LCD display 503 and scrolling keys 504 can also be used to monitor operation. A Touch Port 506 can be used to unload data to a computer or Touch Editor. A Touch Editor (not shown) is a hand-held computer that can accept data and commands via its keyboard and can read and write data from and to Touch Memories. However, it would be more economical to utilize a Touch Pen 500 as the portable terminal 25. The Touch Pen 500 includes a holding clip 507 for ease of use.

Figure 5:
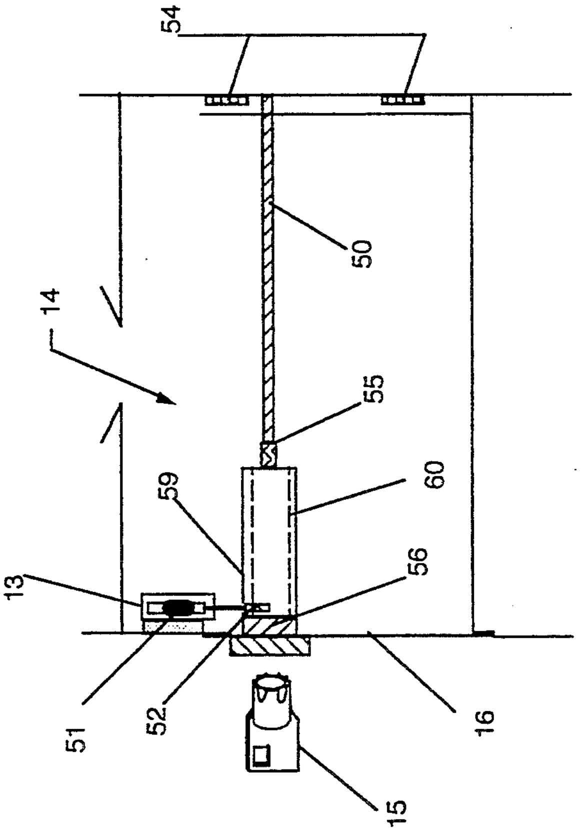
FIG. 5 is a side plan view of the computer activated lock.

Referring next to FIG. 5 a side plan view of the computer activated lock 14 is shown. When a meter maid wishes to retrieve information, collect money or just get into the storage compartment of the computerized parking meter 1 a key 15 must be used in conjunction with the portable terminal 25 (FIG. 2). When the microprocessor 10 receives the correct code and password a voltage will be sent to the computer activated lock 14, opening solenoid 13 thereby allowing key 15 access.

Unless specified by the user, the computer activated lock 14 is in the lock position when spring 51 of solenoid 13 forces plunger 52 through outer casing 59 of the lock and into interior cylinder 60. Plunger 52 prevents interior cylinder 60 from moving even when key 15 is inserted.

When computer activated lock 14 is energized the solenoid 13 allows plunger 52 to rise above interior cylinder 60. Key 15 moves freely and can turn interior cylinder and female DZUS ® fitting 55 a quarter turn. This quarter turn of the interior cylinder unlocks the female DZUS ® fitting 55 from the male DZUS ® fitting 50. This allows coin box 16 to be removed. Sensors 54 communicate to microprocessor 10 of the coin box 16 presence. As coin box 16 is returned and the DZUS ® fittings 54, 50 are locked, the solenoid 13 returns plunger 52 to the locked position.

The DZUS ® fitting 50 provides an easy quarter turn lock with sure fit and adds tension for holding coin box 16 securely. The placement of the computer activated lock 14 may be conventionally in coin box 16 or reversed in machine housing with DZUS ® fitting 50 in coin box 16. Computer activated lock 14 uses a high security lock as disclosed elsewhere. The spring loaded solenoid 13 guarantees that the plunger 52 cannot be dislodged by banging, shaking or even when turned upside down. Furthermore, it insures that when the key 15 is turned after the coin box 16 is returned that the plunger 15 resets automatically and immobilizes the lock. The position of the plunger 15 is monitored by the microprocessor 10 to insure proper seating prior to breaking off communications with a meter maid.

Figure 9:
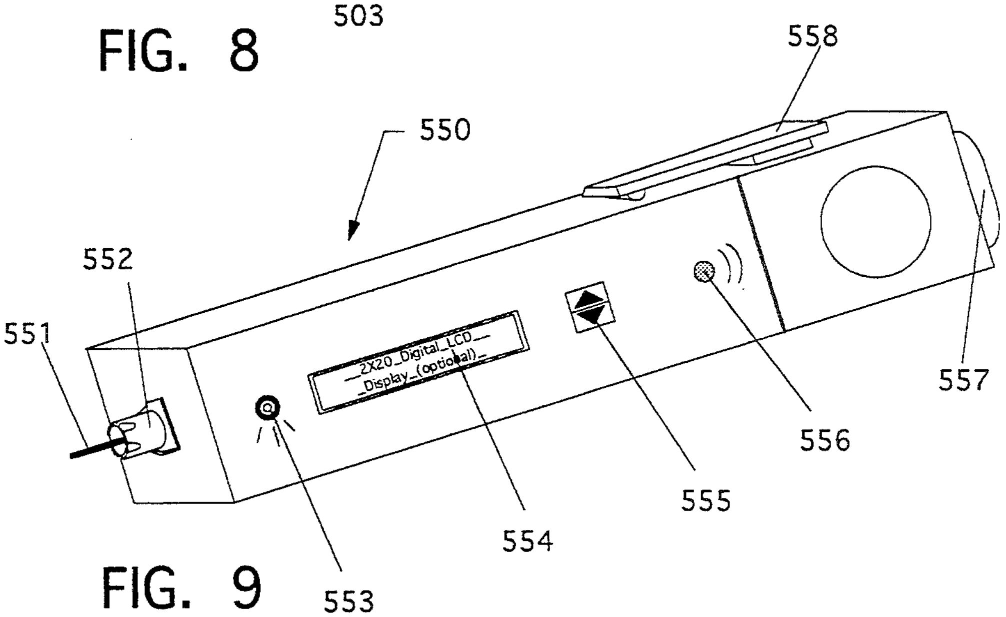
FIG. 9 is a top left front perspective view of a combination high security key and a mobile reader for touch transfer of data.

Referring next to FIG. 9 a Touch Pen 550 has an electrical probe contact 551 and a key 552. A computer activated lock (not shown) has electrical contacts which allow the electrical probe contact 551 and key 552 to be electrically connected to a Touch Memory TM MicroCan TM. The Touch Pen 550 transfers the data necessary to energize the solenoid of the computer activated lock via Touch Memory TM, allowing the key 552 to unlock the computer activated lock. The data from the computerized parking meter 1 can be simultaneously collected. When the data is collected in the Touch Pen 550, LED 553 blinks and beeper 556 beeps to signal the meter maid that the transaction is complete. An optional LCD display 554 and scrolling keys 556 can also be used to monitor operation if desired. A Touch Port 557 is used to unload the collected data to a computer or Touch Editor. The Touch Pen 550 includes a holding clip 558 for convenience.

Figure 6:
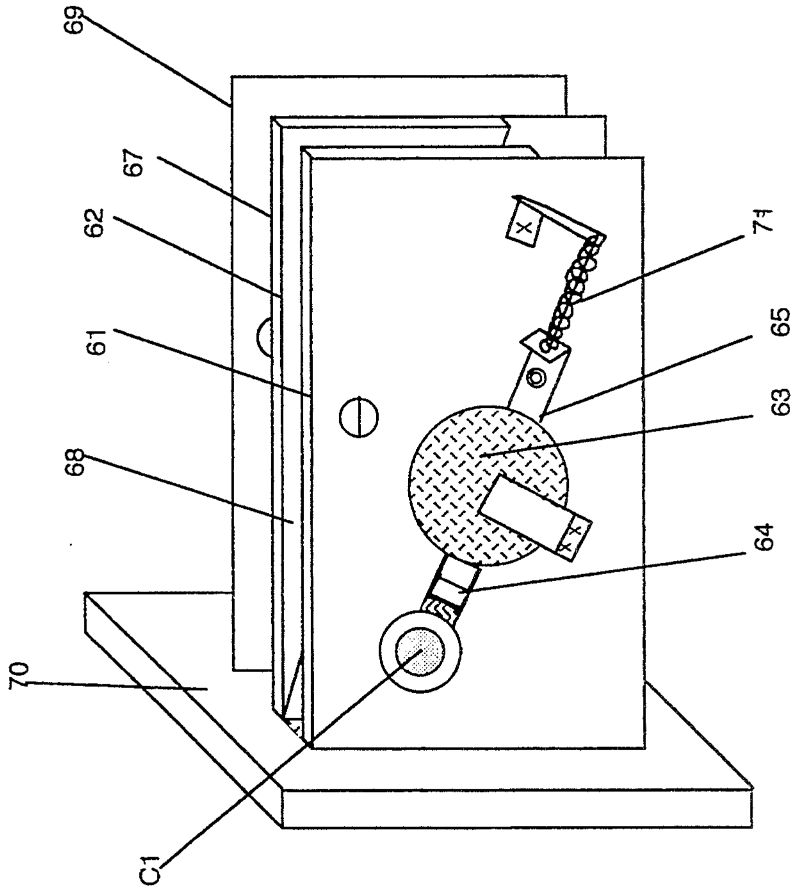
FIG. 6 is a side perspective view of the push coin acceptor.

FIG. 6 shows a general side perspective view of the push coin acceptor 60 attached to a face plate. This coin receiving device, as described in U.S. Pat. No. 4,936,436 (1990) to Keltner (incorporated herein by reference), prevents a coin 30 from leaving the customer's hand (not shown) and completely entering the device until it has been verified as a proper coin. Once validated as a proper coin because of the size specific dimension and the development of a null voltage (in the absence of a magnetic field), the coin 30 is allowed to enter the device. The coin 30 rolls downward, producing an electrical "coin accepted" pulse to the microprocessor 10. The need to reject a bad coin internally and return the bad coin to the customer is eliminated and problems of jamming are eliminated The absence of a magnetic field between coils C1 on the front plate printed circuit board 61 and coil C2 (not shown) on the back plate printed circuit board 62, when coils C1 and C2 are separated by a coin 30 in the slot, gives a null output. This creates a voltage to be sent to the electromagnet 63 which pulls the coin lip 64 of the sliding armature 65 out of the coin path allowing the coin 30 to roll through coin path to the exit point 66. To guard against an individual using a slug or similar improper coin, a time delay is active while the coin moves through the exit point 66 of the push coin acceptor 60. This delay is controlled by an opto diode (not shown) connected to back plate printed circuit board 62 and opto transistor 67 on the front plate printed circuit board 61. For each coin that is accepted through the push coin acceptor 60 a voltage is sent to the microprocessor 10 for collector information.

Although the computerized parking meter 1 has been described with reference to microprocessor's and CPU's, a microcontroller can be substituted for these components if desired. Microcontrollers suitable for use in the computerized parking meter 1 are known in the art and include the Intel ® 8051 and the Dallas Semiconductor TM 5000T.

Although the present invention has been described with reference to preferred embodiments, numerous modifications and variations can be made and still the result will come within the scope of the invention. No limitation with respect to the specific embodiments disclosed herein is intended or should be inferred.

I claim:

1. In a computerized parking meter system, the process of providing maximum revenues comprising the steps of:

(a) partially inserting a coin in a coin collector;

(b) rejecting the coin if parking restrictions are preprogrammed in a computer attached to said coin collector;

(c) rejecting the coin as improper by means of detecting magnetic variations created by said improper coin when it is partially inserted into said coin collector;

(d) accepting a coin as good if no magnetic variations are detected when it is partially inserted into said coin collector;

(e) adding to a coin total count;

(f) checking a real time clock;

(g) adding a time purchased to a time remaining;

(h) displaying the time remaining;

(i) sending a pulse of ultrasonic waves toward a parking space;

(j) receiving the reflections of the ultrasonic waves off an object;

(k) determining the distance to the object;

(l) ignoring any distance to the object which is outside a window of distances programmed into the computer attached to said coin collector;

(m) setting any distance to the object which is within the window as a vehicle baseline distance;

(n) periodically rechecking the distance to the object for which the vehicle baseline distance was set;

(o) resetting the time remaining on the parking meter to zero when a rechecked distance exceeds the baseline distance; and (p) setting an alarm means for indicating when the time remaining equals zero.

2. The process of claim 1, further comprising the steps of:

(a) entering a sleep mode on the computer before a power-on mode, said power-on mode comprising the step of connecting said computerized parking meter system to a source of power; and (b) entering a sleep mode on the computer after each of the following steps: partially inserting a coin in a coin collector; rejecting the coin if parking restrictions are pre-programmed in a computer attached to said coin collector;

rejecting the coin as improper by means of detecting magnetic variations created by said improper coin when it is partially inserted into said coin collector;

accepting a coin as good if no magnetic variations are detected when it is partially inserted into said coin collector;

adding to a coin total count;

checking a real time clock;

adding a time purchased to a time remaining;

displaying the time remaining;

sending a pulse of ultrasonic waves toward a parking space;

receiving the reflections of the ultrasonic waves off an object;

determining the distance to the object;

ignoring any distance to the object which is outside a window of distances programmed into the computer attached to said coin collector;

setting any distance to the object which is within the window as a vehicle baseline distance;

periodically rechecking the distance to the object for. which the vehicle baseline distance was set;

resetting the time remaining on the parking meter to zero when a rechecked distance exceeds the baseline distance; and setting an alarm means for indicating when the time remaining equals zero.

3. The process of claim 1, further comprising the step of:

(a) communicating with a customer by displaying pre-programmed messages.

4. The process of claim 1, further comprising the step of:

(a) communicating with a customer by playing pre-programmed audible messages.

5. The process of claim 1 further comprising the step of:

(a) playing pre-programmed music when the coin is inserted.

6. The process of claim 1 further comprising the step of:

(a) checking the distance to an object periodically when no coin is inserted; and (b) activating alarm means if the distance to the object is within the programmed window.

7. The process of claim 1 wherein said alarm means further comprises a flashing display.

8. The process of claim 1 wherein said alarm means further comprises a broadcast radio signal.

9. The process of claim 1 further comprising the step of:

(a) displaying messages on a notice sign on a pre-programmed timed basis.

10. The process of claim 1 further comprising the steps of:

(a) communicating with a meter maid through a portable computer terminal;

(b) requesting a code from the meter maid;

(c) receiving the code;

(d) verifying that the code received is authorized;

(e) refusing access and activating an alarm if the code is not authorized;

(f) allowing access if the code is valid; and (g) energizing a solenoid allowing a key to unlock a coin box that is attached to said coin collector.

11. The process of claim 1 further comprising the steps of:

(a) receiving a temperature from a temperature sensor;

(b) using a compensation factor determined from said temperature to compute said object distance, said vehicle baseline distance and said window of programmed distances; and (c) applying the compensation factor to measurements of real time, said purchased time, and said time remaining.

12. In a computerized parking meter system, the process of collecting coins comprising the steps of:

(a) communicating with a meter maid through a portable computer terminal;

(b) requesting a code from the meter maid;

(c) receiving the code;

(d) verifying that the code received is authorized;

(e) refusing access and activating an alarm if the code is not authorized;

(f) allowing access if the code is valid;

(g) energizing a solenoid allowing a key to unlock a coin box that is attached to a coin collector means; and (h) collecting from said coin box.

13. In a computerized parking meter system, the process of collecting coins of claim 12 wherein the code further comprises an employee ID number of the meter maid.

14. In a computerized,parking meter system, the process of collecting coins of claim 13 further comprising the step of:

(a) creating a table of authorized collection times: and (b) comparing the employee ID number to the table of authorized collection times.

15. The process of collecting coins of claim 12 wherein the code further comprises a total amount collected from three consecutive collections which were immediately prior to a present collection.

16. The process of collecting coins of claim 15 further comprising the steps of:

(a) outputting a current collection amount and verifying receipt of same by the portable computer terminal;

(b) erasing an amount which was recovered three collections immediately prior to the present collection;

(c) adding the current collection amount to amounts gathered from two immediately prior collections as the code to be utilized when coins are next collected.

17. In a computerized parking meter system, the process of collecting coins of claim 12 further comprising the step of:

(a) communicating with a central computer and making an inquiry by license plate number of a parked vehicle.

18. In a computerized parking meter system, the process of collecting coins of claim 12 further comprising the step of:

(a) communicating with a central computer and making an inquiry by employee ID number.

19. A computerized parking meter system, comprising:

means for providing power functioning to operate a microprocessor and an interface of the computerized parking meter;

said interface being connected to said microprocessor;

a coin acceptor with means for accepting a proper coin and means for rejecting an improper coin before total insertion of the coin whereby acceptance of a proper coin sets an allowable parking time;

a real time clock connected to said microprocessor functioning to compute calendar days and time based calculations including time out of the allowable parking time;

means connected to said microprocessor for computing time remaining in said allowable parking time;

means connected to said microprocessor for operating in real time functioning to allow interruptions;

means connected to said interface for displaying the time remaining in said allowable parking time;

an ultrasonic transducer functioning to send and receive signals from said interface;

means for computing a distance to a parked vehicle utilizing said ultrasonic transducer;

means for comparing said distance to the parked vehicle to a programmed window of distances;

means connected to said interface and utilizing said ultrasonic transducer for periodically rechecking said distance to the parked vehicle;

means for resetting the time remaining in the allowable parking time to zero when said parked vehicle leaves a parking space as determined by the programmed window of distances;

a portable computer terminal having means for communicating with said computerized parking meter;

a coin box having a key lock attached to said coin box;

means for preventing a key from unlocking the key lock; and said means for preventing a key from unlocking the key lock being programmably controlled.

20. The computerized parking meter of claim 19 wherein said means for providing power further comprises a battery.

21. The computerized parking meter of claim 20 wherein said battery can be recharged by a solar panel.

22. The computerized parking meter of claim 20 wherein said battery can be recharged by an external power source.

23. The computerized parking meter of claim 19 wherein said means for computing further comprises a sleep mode.

24. The computerized parking meter of claim 19 further comprising a speaker.

25. The computerized parking meter of claim 19 further comprising a radio transmitter.

26. The computerized parking meter of claim 19 further comprising a temperature sensor and means for computing a temperature compensation factor for accurately computing distances, including the programmed window of distances, and times, including the allowable parking time in varying temperatures.

27. The computerized parking meter of claim 19 wherein said means for computing further comprises a microcontroller.

28. The computerized parking meter of claim 27 wherein said microcontroller further comprises a battery to hold a state of the system while in a total power off mode.

29. The computerized parking meter of claim 19, wherein said means for communicating further comprises a data transfer means functioning to transfer a stored memory with momentary contact.

30. The computerized parking meter of claim 29 wherein said data transfer means is utilized as a means for purchasing said allowable parking time by credit.

31. The computerized parking meter of claim 19 wherein said means for communicating further comprises a compact electronic data module with an integrated circuit including memory and a battery, a one-wire bus protocol, and a one-wire-to-three-wire converter functioning to allow read/write access to said module, 32. The computerized parking meter of claim 31 wherein said electronic data module further comprises a real time clock.

33. The computerized parking meter of claim 19 wherein said key lock further comprises:

an outer casing;

an interior cylinder;

a key;

said means for preventing a key from unlocking the key lock further comprises:

a microprocessor;

a solenoid;

means for energizing said solenoid;

said solenoid further comprising a spring which forces a plunger through the outer casing of said lock and into said interior cylinder, wherein said plunger prevents said interior cylinder from moving by means of the key; and said microprocessor further comprising means for energizing said solenoid upon receipt of an access code, thereby retracting said plunger and allowing said key to turn said interior cylinder and unlock said lock.

34. The computerized parking meter of claim 33 further comprising a terminal wherein the position of said plunger is monitored by said microprocessor to insure proper seating prior to said key lock being locked, and said microprocessor communicates proper seating of said plunger to said terminal.

* * * * *